(12) United States Patent
Watanabe

(10) Patent No.: US 10,412,431 B2
(45) Date of Patent: Sep. 10, 2019

(54) SYSTEM AND METHOD FOR ONLINE COLLABORATION OF SYNCHRONIZED AUDIO AND VIDEO DATA FROM MULTIPLE USERS THROUGH AN ONLINE BROWSER

(71) Applicant: Goji Watanabe, Torrance, CA (US)

(72) Inventor: Goji Watanabe, Torrance, CA (US)

(*) Notice: Subject to any disclaimer, the term of this patent is extended or adjusted under 35 U.S.C. 154(b) by 0 days.

(21) Appl. No.: 15/351,792

(22) Filed: Nov. 15, 2016

(65) Prior Publication Data

US 2017/0142458 A1 May 18, 2017

Related U.S. Application Data

(60) Provisional application No. 62/255,740, filed on Nov. 16, 2015.

(51) Int. Cl.
| | | |
|---|---|---|
| *H04N 21/25* | (2011.01) | |
| *H04N 21/61* | (2011.01) | |
| *H04N 21/242* | (2011.01) | |
| *H04N 21/43* | (2011.01) | |
| *H04N 21/222* | (2011.01) | |
| *H04N 21/2387* | (2011.01) | |
| *H04N 21/233* | (2011.01) | |
| *H04N 21/2743* | (2011.01) | |
| *H04N 21/4788* | (2011.01) | |
| *H04N 21/8547* | (2011.01) | |

(52) U.S. Cl.
CPC ....... *H04N 21/252* (2013.01); *H04N 21/2223* (2013.01); *H04N 21/233* (2013.01); *H04N 21/2387* (2013.01); *H04N 21/242* (2013.01); *H04N 21/2743* (2013.01); *H04N 21/4302* (2013.01); *H04N 21/4788* (2013.01); *H04N 21/6125* (2013.01); *H04N 21/6175* (2013.01); *H04N 21/8547* (2013.01)

(58) Field of Classification Search
CPC .......... H04N 21/2223; H04N 21/2387; H04N 21/252; H04N 21/6125; H04N 21/242; H04N 21/4302; H04N 21/6175
See application file for complete search history.

(56) References Cited

U.S. PATENT DOCUMENTS 8,487,173 B2   7/2013 Emmerson
9,635,131 B2   4/2017 Roberts, Jr. et al.
(Continued)

*Primary Examiner* — Yassin Alata
(74) *Attorney, Agent, or Firm* — LeClairRyan

(57) ABSTRACT

A system and method for online collaboration of synchronized audio and video data from multiple users through an online browser is disclosed. An online network environment (e.g., online social media platform) that is accessible by users through an online browser includes an online player/recorder that is capable of playing back multiple audio and video data uploaded by multiple users in real time, and to change tempo while maintaining the original audio key or change pitch while maintaining the original tempo during playback. The platform captures playback positions of audio data based on the corresponding playback positions of video data. The platform includes a synchronizing algorithm that calculates the discrepancies between audio playback positions and the corresponding video playback positions so that the audio and video data play in synchronization.

8 Claims, 9 Drawing Sheets

SCROLL BAR PAUSE AND SEEK ACTION

(56) References Cited

U.S. PATENT DOCUMENTS

| | | | |
|---|---|---|---|
| 2011/0161836 A1* | 6/2011 | Mu | H04L 12/1813 |
| | | | 715/756 |
| 2015/0135045 A1 | 5/2015 | Hoffman et al. | |
| 2016/0234345 A1* | 8/2016 | Roberts, Jr. | H04L 67/306 |
| 2017/0105038 A1* | 4/2017 | Subramanya | H04N 21/4307 |

* cited by examiner

"MASTER FRAME"

| FRAME "A" 400K DATA SIZE | FRAME "B" 100K DATA SIZE | FRAME "C" 300K DATA SIZE | FRAME "D" 350K DATA SIZE |
|---|---|---|---|
| COLOR \| MOVEMENT | COLOR \| MOVEMENT | COLOR \| MOVEMENT | COLOR \| MOVEMENT |
| FRAME "E" 250K DATA SIZE | FRAME "F" 150K DATA SIZE | FRAME "G" 200K DATA SIZE | FRAME "H" 500K DATA SIZE |
| COLOR \| MOVEMENT | COLOR \| MOVEMENT | COLOR \| MOVEMENT | COLOR \| MOVEMENT |

FRAME "A" IMAGE DATA SIZE 400K = COLOR + MOVEMENT = SYNCHRONIZED INSIDE FRAME "A"
FRAME "B" IMAGE DATA SIZE 100K = COLOR + MOVEMENT = SYNCHRONIZED INSIDE FRAME "B"
FRAME "C" IMAGE DATA SIZE 300K = COLOR + MOVEMENT = SYNCHRONIZED INSIDE FRAME "C"
FRAME "D" IMAGE DATA SIZE 350K = COLOR + MOVEMENT = SYNCHRONIZED INSIDE FRAME "D"
FRAME "E" IMAGE DATA SIZE 250K = COLOR + MOVEMENT = SYNCHRONIZED INSIDE FRAME "E"
FRAME "F" IMAGE DATA SIZE 150K = COLOR + MOVEMENT = SYNCHRONIZED INSIDE FRAME "F"
FRAME "G" IMAGE DATA SIZE 200K = COLOR + MOVEMENT = SYNCHRONIZED INSIDE FRAME "G"
FRAME "H" IMAGE DATA SIZE 500K = COLOR + MOVEMENT = SYNCHRONIZED INSIDE FRAME "H"

FRAME "A"+"B"+"C"+"D"+"E"+"F"+"G"+"H" = MULTIPLE FRAMES SYNCHRONIZED AS ONE

[ SOUND POSITION = 8,192* x (VIDEO POSITION x 5.3833) +6 ]

FIG. 2

* AUDIO DATA REQUIRES AT LEAST 4BYTE TO MAKE A SOUND. 8,192x4(BYTE)x2(LEFT & RIGHT) = 65,535

**Var st:int=((event.position)/8192)x0.0027

VIDEO NORMAL TEMPO (SPEED) = SOUND IS REAL TIME
(30 FRAMES PER 1 SECOND = NORMAL)

| 30 FRAMES PER SECOND | 30 FRAMES PER SECOND | 30 FRAMES PER SECOND | 30 FRAMES PER SECOND |
|---|---|---|---|

VIDEO IMAGE SLOW TEMPO (SPEED) X(2) = SOUND IS REAL TIME
(30 FRAMES + 30 PAUSES PER 2 SECOND STRETCH = VIDEO SLOW)

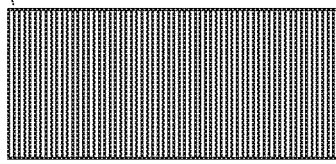

| LINE = 1 PAUSE

VIDEO IMAGE SLOW TEMPO (SPEED) X(3) = SOUND IS REAL TIME
(30 FRAMES + 60 PAUSES PER 3 SECOND STRETCH = VIDEO SLOW)

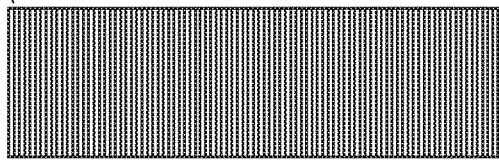

SOUND = REAL TIME FAST OR SLOW VIDEO IMAGE

FIG. 5

*AUDIO DATA REQUIRES AT LEAST 4 BYTE TO MAKE A SOUND. 8,192 x 4(BYTE)x2 (LEFT & RIGHT)=65,535

**Var st:int=((event.position)/8,192)x0.0027

*** i+1 (WHEN AN AUDIO IS SLOWER THAN A VIDEO), (j+1) x -1 (WHEN AN AUDIO IS FASTER THAN A VIDEO)

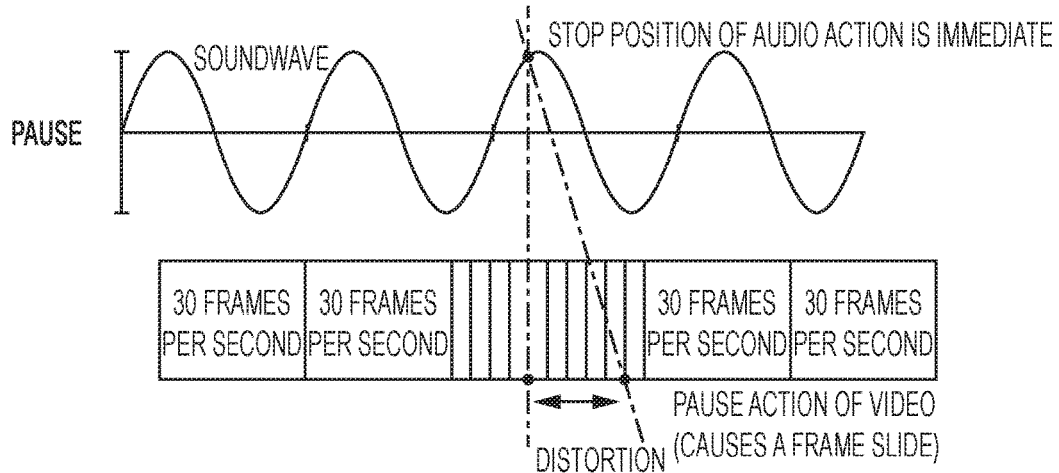
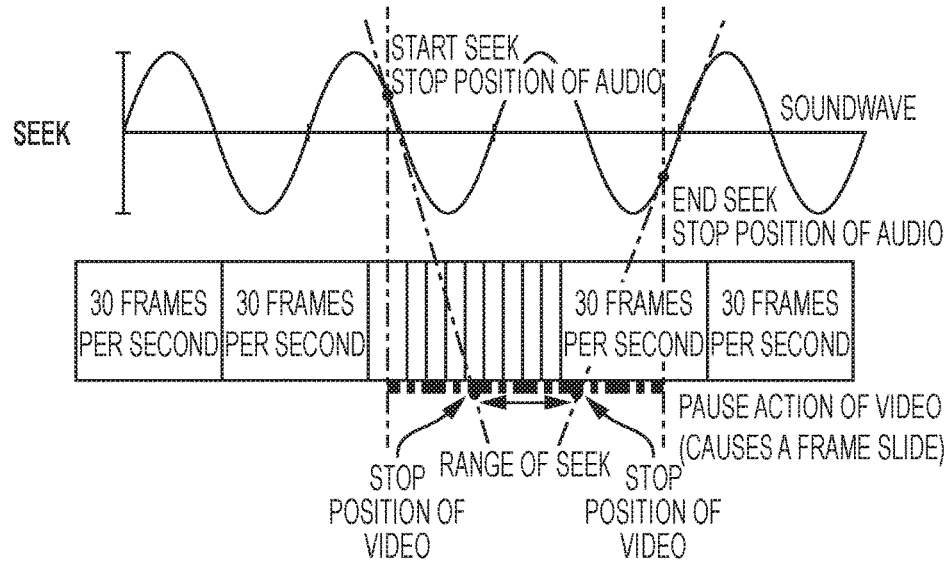
FIG. 8

* AUDIO DATA REQUIRES AT LEAST 4BYTE TO MAKE A SOUND. 8,192 x 4(BYTE)x2(LEFT & RIGHT) = 65,535

**Var st:int=((event.position)/8192)x0.0027 var pp=(nsStream[0].time x 5.3833)+6 = (video position x 5.3833)+6

```
            * num += 1;
     if(num == 2){s1co += 0.5; num = 0;}
            if(s1co % nxf){
            nsStream[0].resume();
               }else{
            nsStream[0].pause();
               }
            s1owF1g = false;

var gg4:int = Math.ceil((nsStream[0].time - pausePosition) * (8192 * t1n)) / 8192;
         var ggd:int = int((position - gg0)/8192);
              var wx = gg4 - ggd;

if(rate != 1){var smp:int = 1024;}else{smp = 0;}
            if(wx > -2 && wx < 0){
              ec1 = 0; ec0 = 0;
                 }else{
              ec0 = (smp * wx);
         for(i=0 ; i < ec0 ; i++){ec1 = i+1;}
                  }
                if(wx < -2){
    for(var j=0 ; j < 1024 ; j++){ec1 = (j+1) * -1;}
                  }
```

SYSTEM AND METHOD FOR ONLINE COLLABORATION OF SYNCHRONIZED AUDIO AND VIDEO DATA FROM MULTIPLE USERS THROUGH AN ONLINE BROWSER

RELATED APPLICATION

This application claims the benefit of priority under 35 U.S.C. § 119(e) to Provisional Application No. 62/255,740, filed on Nov. 16, 2015, which is incorporated by reference in its entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

THE NAMES OF THE PARTIES TO A JOINT RESEARCH AGREEMENT

Not applicable.

BACKGROUND OF THE INVENTION

1. Field

The invention relates to a system and method for simultaneously playing back synchronized audio and video data from multiple users in an online environment, such as social media using Internet browsers. The invention enables online users, through an online environment such as social media through Internet browsers, to playback synchronized multiple audio and video data in real time, and to change the tempo during audio and video playback while maintaining the original audio key (i.e., pitch). The invention also enables online users to change the original audio key (i.e., pitch) during audio and video playback while maintaining perfect synchronization between audio and video data.

2. Description of Related Art

In today's Internet age, it is often desirable to collaborate on creating or playing back audio and video contents in an online virtual environment, for example social media using Internet browsers, because collaborating artists are often geographically separated and gathering all collaborating artists at one location for creating, experiencing, practicing, and/or collaborating can be difficult and expensive. For example, in the context of music creation and performance, it is much easier and economically advantageous if musicians can collaborate as a virtual band.

Moreover, musicians often have varying levels of skill in different aspects of music, such as skill level in different musical instruments, vocal abilities, music creativity, and varying perspective of music, such as music theory, composition, and other traits that affect the artistic rendition of music. Contributions from different musicians often lead to different music creations. Not every musician, however, knows or has access to all the music elements that may be contributed by other musicians. Thus, systems and/or methods that enable a user to post his or her initial music creation on an online platform so that other users may access the initial music creation and contribute additional music elements is desired.

Prior art discloses ideas of an online collaboration system which enables users to post an idea on the online platform of a website browser and enable other users to see the idea and give their comments or feedbacks to the idea and rate the idea in a discussion section. It is well known in the art to provide music uploading and downloading. Artists, including musicians, often look for sharing creative projects that utilizes audio and video expressions within a collaboration online environment so that they can reveal their projects, performances and attract other people to contribute and enjoy their projects (such as a music creation). For example, U.S. Pat. No. 8,487,173 discloses a methods and systems for providing a collaborative music website where users can create and edit their music with others. This invention includes remotely uploading music tracks that are created off-line by users, creating a band, and joining other users' band via an online network. Other inventions also outline methods and/or systems for providing an online collaborative website where a musician either join a virtual band with others or create their own virtual band to attract others and edit music tracks remotely (i.e., off-line). These inventions, however, provide for only music (audio) collaboration, which includes multiple music tracks. No video collaboration is disclosed. Further, these inventions do not disclose online editing (such as changing pitch or tempo) or online audio and video playback. When audio and video data are played back in an online environment in real time, audio and video synchronization is very important and difficult to achieve. It is difficult to playback a plurality of audios and videos with perfect synchronization because the data formats between audio and video are different. This is a common issue in online playback that audio and video would go out of sync, which may happen right at the beginning or occur slowly over time. Many factors may cause this problem, including data transfer rate. Video generally requires more data and longer time to process, matching video frame rate and audio sample rate in real time can be challenging. Furthermore, it is difficult to simultaneously playback a plurality of video frames in synchronization because each video frame's data size being uploaded within one larger collaborative frame is individually different. The size of each video frame may be different depending on its individual data amount used, even if the aspect ratio of each video frame is identical. Data size of each individual video frame is based on the image color and image movement within the uploaded video contents. Some video frames have more or less color saturation and speed of movement when playing. The present invention enables synchronization of the multiple individual frames with different Data size for each frame to play as one combined frame. None of these prior inventions enables users to upload and edit audio and video data with synchronization.

Therefore, there is a need for a system and method for online collaboration of multiple tracks with audio and video data synchronization. Because of this system and method, users may share their creative works online while other users may view and listen to the creative works online, contribute additional video and audio elements to the creative works online, participating users may playback audio and video data in sync and in real time, and all users may edit music and audio online (such as changing pitch and/or tempo) in real time. Separating and syncing multiple tracks of video and audio online enables users to bring their creative works and collaborate with people all over the world.

BRIEF SUMMARY OF THE INVENTION

One of the uses for this invention is creating and editing collaboratively multiple tracks of video and audio via an online network platform, for example, through Internet browsers. This platform enables an online player/recorder to simultaneously playback a synchronized plurality of video and audio tracks seamlessly. This includes capturing the playback position of sound wave position ("MVP") based on the playback position of the video frame position ("VFP"). A synchronizing algorithm Code was created that can calculate the discrepancy between the SWP with the VFP and seamlessly adjusts the SWP and VFP when played together simultaneously so that the audio and video will not go out of sync.

To permit collaboration on a work-in-progress project (e.g., music, film acting, dance, voice acting, etc.), a host user first uploads and posts/publishes the project on a website as a "open collaboration" project so that other users may participate in the same project.

For instance, when creating a song project with a single musical instrument (e.g., guitar, piano, drums, vocals), a host user uploads and posts an open collaboration project on a website and allowing other users to participate and collaborate within the project, for example, by recording one or more parts using a different musical instrument (e.g., vocal, bass, keyboard, drums). This can be accomplished by utilizing an online player/recorder available within the website (accessible via Internet browsers). Multiple musical instruments may be recorded on separate tracks by other users. The uploaded and finished project can be edited, such as changing the tempo (speed) and key (pitch) of individual tracks, in real time, and perfect synchronization is maintained among multiple uploaded audios and videos while they are being viewed and played by online users.

These and other aspects of this invention will become apparent to those skilled in the art after reviewing the following description of the invention.

BRIEF DESCRIPTION Of THE DRAWINGS

The above-mentioned features and objects of the present disclosure will become more apparent with reference to the following description taken in conjunction with the accompanying drawings wherein like reference numerals denote like elements and in which:

FIG. 2 shows a user interface that includes eight user windows displaying audio and video. Each individual Frame data size is different.

FIG. 5 is a graphic representation of a method to change video playback to slow down the tempo (speed). Without changing the sound in real time fast or slow.

FIG. 8 is a graphic representation of an algorithm formula for audio (sound waves) and video (frames) playback and editing formula to adjust the playback position when a cursor on the scroll bar is played back, paused, or moved.

DETAILED DESCRIPTION OF THE INVENTION

For illustrative purpose, the principles of the present invention are described by referring to an exemplary embodiment thereof. Before any embodiment of the invention is explained in detail, it should be understood that the invention is not limited in its application to the details of construction and the arrangement of components set forth in the following description or illustrated in the following drawings. The invention is capable of other embodiments and of being practiced or of being carried out in various ways. Also, it should be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present invention focuses on online collaboration of audio and video between multiple users in social network platform. The method realizes a perfect synchronization of a plurality of audio and video data and enables users to simultaneously playback the plurality of audio and video data while maintaining the original key through an online browser network. Users around the globe can create their own projects and collaborate with other users who are interested in the existing projects to share their works online.

Figure 1:
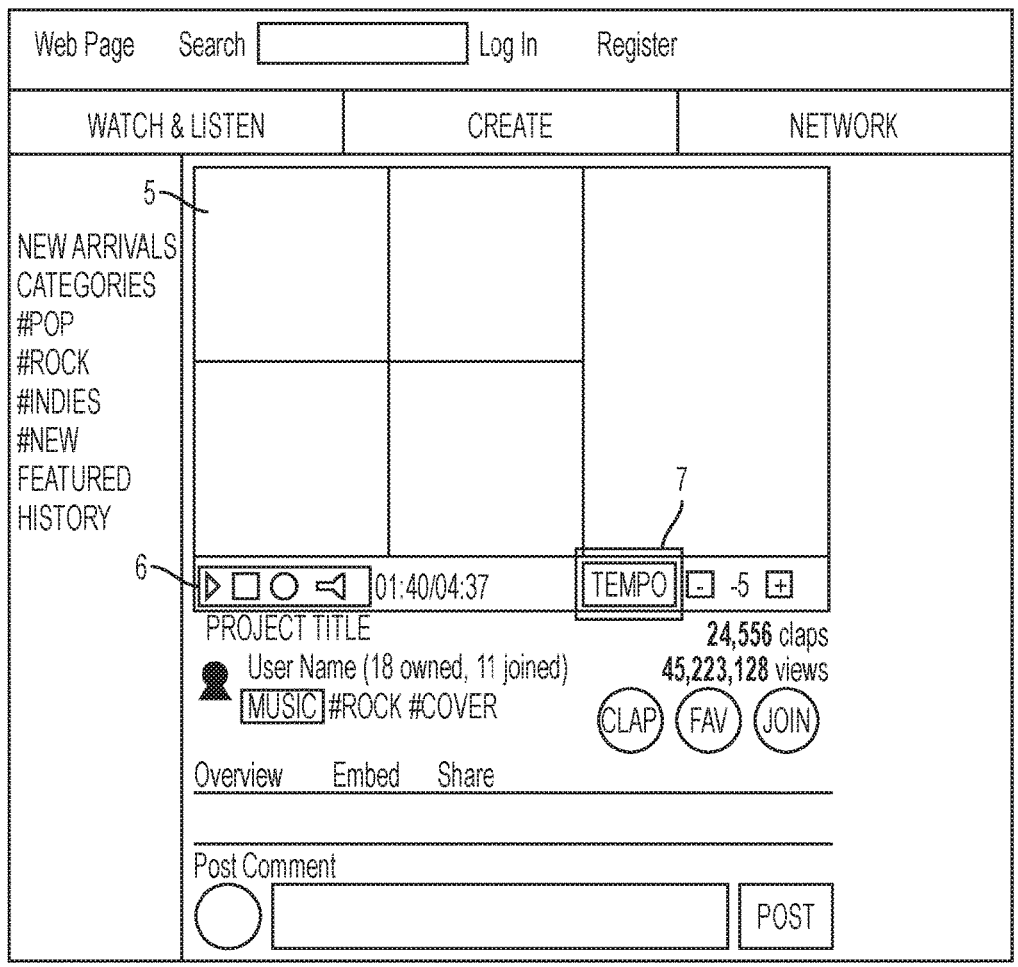
FIG. 1 is a user interface that may be used to simultaneously playback and edit a plurality of audio sound waves and video frames.

FIG. 1 illustrates a graphic user interface of an Internet website, which may be accessible through Internet browsers, where a user can login to collaborate with other users and enable others to edit a collaborative project. Once the user log-in to the web page, the user can watch a project, record their own project, join other users' projects, collaborate with other users to make a project, and/or edit a project by changing the tempo (speed) and/or key (sound pitch) of a finished project. A plurality of audios and videos are shown in screen 5, which enables users to arrange a ratio of small video screens. Users may manipulate actions (playback, stop, record, sound control) via icon 6 and change the tempo (speed) and key (sound pitch) of a played video on icon 7.

FIG. 2 illustrates a user interface that includes eight user windows displaying audio and video for each user window. Each user window has its own frame data. Each frame data size may be different. Data size of each frame is based on the image color and image movement of the content within each user window. In one embodiment, synchronization of the multiple individual frames with different data size for each frame to play as one combined master frame is calculated using the algorithm: Sound Position=8,192×(Video Position×5,3833)+6 ("SyncWave Algorithm"). In this embodiment, the SyncWave Algorithm calculates each frame to synchronize as a whole when simultaneous playback is initiated. By way of example, when individual musicians perform and play the same song and the song is uploaded individually in one of eight frames and playback is viewed, the interface would show the song's audio and video playback is in sync with the other frames inside the master frame.

Figure 3:
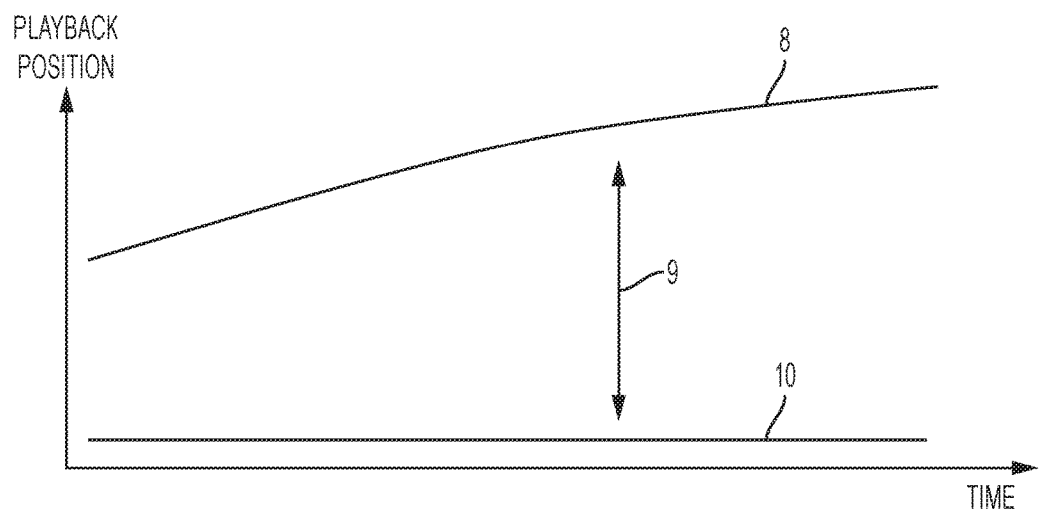
FIG. 3 is a graphic representation of a gap between the playback position of audio sound waves and video frames in normal tempo (speed).
Figure 4:
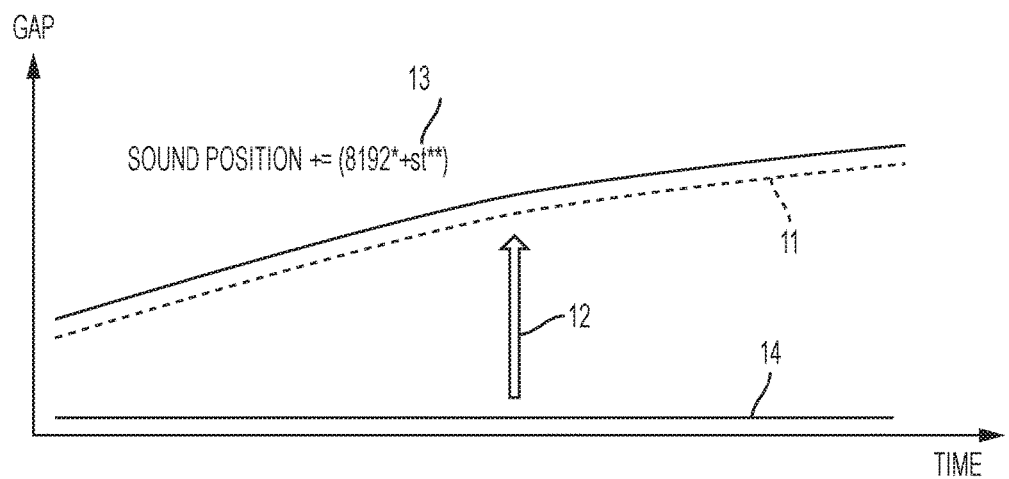
FIG. 4 is a graphic representation of a mechanism and a formula to adjust the playback position of audio sound waves to the playback position of video frames in normal tempo (speed).

FIGS. 3 to 6 show a method for eliminating the gap deviation that naturally occurs when audio data (sound wave) is played with video data (frame) simultaneously. FIG. 3 is a graphic representation of a gap deviation occurred between audio and video data. A recorded analog audio data (sound wave) is going to be systematically converted to digital data and played in an online browser 10. The video data (frame) and its normal occurrence of the known disparity will be remedied as shown in 8. Based on how video data (frame) is normally converted against the audio data (sound waves) in an online browser, the naturally occurring gap deviation results in the audio sound data being delayed against the video data (frame) 9. Referring to FIG. 4, a synchronizing algorithm formula was created that can calculate and adjust the discrepancy between the audio position (sound wave) with the video position (frame) and seamlessly adjusts 12 both the audio data (sound wave) with the video data (frame) 11 by making adjustment within the audio data (sound wave) 14 so that it plays along the video data (frame) 11. The formula 13 shown in FIG. 4 shows an effective synchronization of the audio data (sound wave) and video data (frame) in normal tempo (speed). The disparity does not show when a user changes the playback tempo (speed), "var stint=(event.position)/8192×0.0027" is an embodiment of sound syncing algorithm (algorithm is coded using ActionScript).

Referring now to FIG. 5, a method for changing a playback tempo (speed) of a pluralized audio data (sound wave) and video data (frame) that are simultaneously played is described. Inserting a pause in the gap deviation when adjusting the tempo (speed) to a slower speed achieves the synchronization of changing audio data (sound wave) and video data (frame), i.e., eliminating the gap deviation. Sound is heard in real time against the slow video image. (normal frame per second in video is calculated at about 30 frames per second). Slowing down the video, the SyncWave Algorithm fills in the gaps by creating pauses in place of empty frames. By way of example, 2 times slower creates double the frame ratio to show about 30 frames plus 30 frames of pauses per 2 seconds in slowing down the video image; and 3 times slower create triple the frame ratio to show about 30 frames plus 60 frames of pauses per 3 seconds in slowing down the video image.

Figure 6:
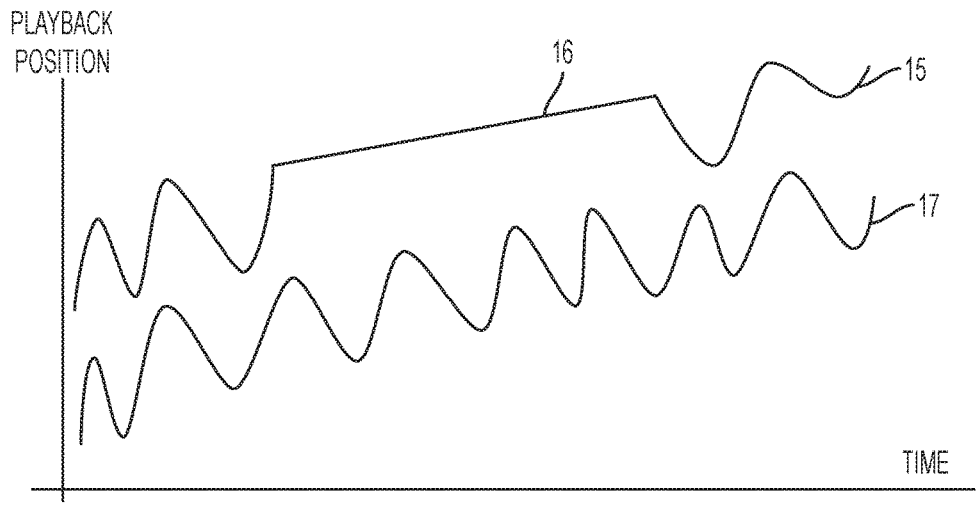
FIG. 6 is a graphic representation of a gap between the playback position of audio (sound waves) and video (frames) in a slower tempo (speed).

FIG. 6 illustrates what would happen to the audio data (sound wave) and video data (frame) when playback tempo (speed) is changed to slow. In one embodiment, the audio data (sound wave) 17 continuously plays as normal. However the video data (frame) 15 is not playing normally due to the change in speed. A gap occurs between the playback position of audio (sound waves) 17 and video (frames) 15 in a slower tempo (speed). Because of the synchronizing algorithm formula's automatic adjustment, videos are without video frame delays, stutters and/or distortion during playback. Distortion 16 is caused when releasing the memory, which is accumulated through the high-speed processing in making the playback slow.

Figure 7:
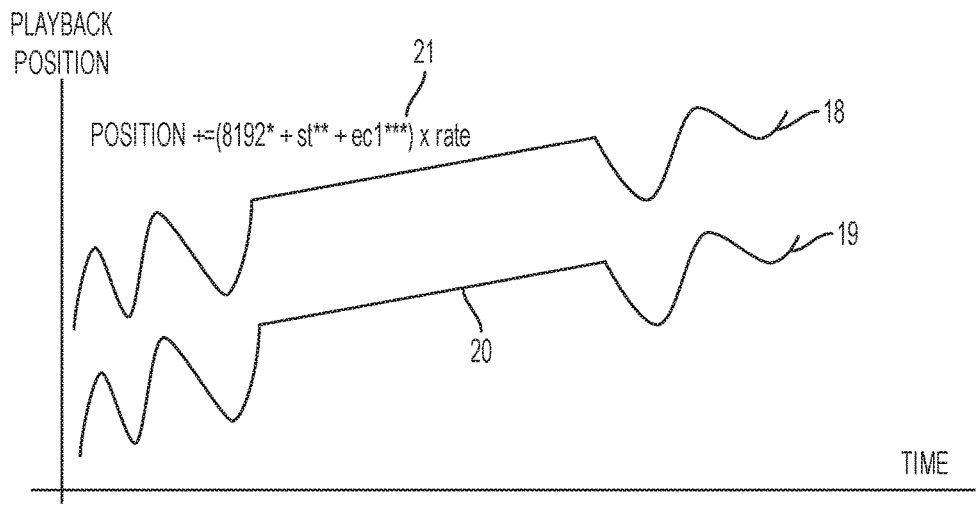
FIG. 7 is a graphic representation of a mechanism and a formula to adjust the playback position of audio (sound waves) to the playback position of video (frames) in a slower tempo (speed).

FIG. 7 describes a method and formula for adjusting gap deviation when an irregular video data (frame) interacts with normal audio data (sound wave) as well as when a normal video data (frame) 18 plays with an irregular audio data (sound wave) 19. As shown in FIG. 7, a mechanism and a formula adjust an irregular audio data (sound) 20 to the same as the video data (frame) by adjusting the playback position of audio (sound waves) 19 to the playback position of video (frames) 18 in a slower tempo (speed). A synchronizing algorithm formula 21 is used to calculate how much sound data needs to be fixed in order to adjust to video data (frame). "i+1" is a program coding algorithm name for adjusting audio speed to make it go faster; and "(j+1)x−1" is a program coding algorithm name for adjusting audio speed to make it go slower.

FIG. 8 illustrates a method and formula for pausing and adjusting a playback position for audio sound and video frames when playback is paused or a cursor on a scroll bar is moved (e.g., the seek function). Whenever a user uses the cursor to watch a particular part of what they are looking for and moves the playback position of the audio and video, the audio data stops immediately. However the video data slips forward off its track from its regular position. The SyncWave Algorithm maintains a synchronized playback position for the audio and video immediately.

Figure 9:
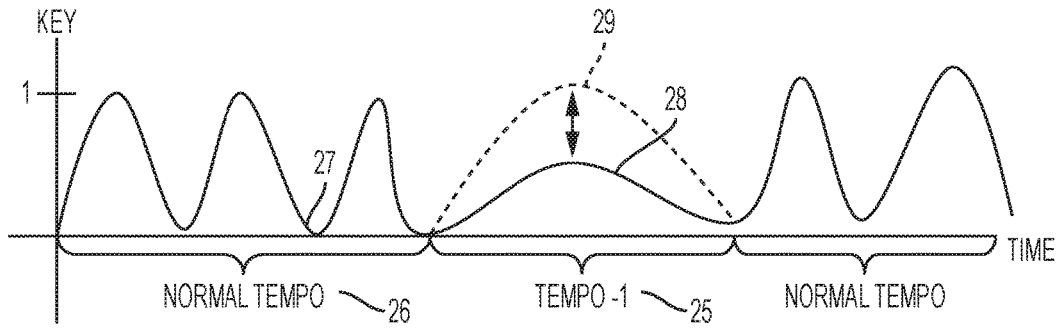
FIG. 9 is a graphic representation of the mechanism to maintain the same key (pitch) in a slower tempo (speed).

The key (pitch) of a sound is changed automatically when the corresponding tempo (speed) is changed to slow without adjustment. FIG. 9 is a graphic representation that illustrates how the key (pitch) of audio data (sound) goes to a slow tempo (speed) and how it is automatically adjusted to become a regular wavelength. When a wavelength of an audio data (sound) 27 is played at a normal tempo 26, it is played normally and maintains the original key. However, once the tempo (speed) is slowed down 25, the wavelength of the audio data (sound) bends and goes off from the original key (pitch) as described in 28. The synchronizing algorithm formula, automatically adjusts the bent wavelength of the audio data (sound) to the original key (pitch) 29.

Figure 10:
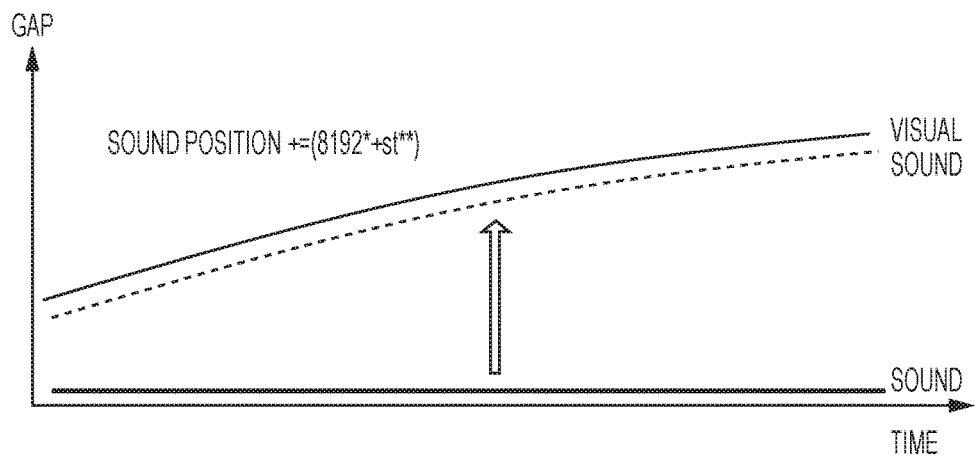
FIG. 10 is a graphic representation of a mechanism and a formula to adjust the playback position of audio sound waves to the playback position of video frames in normal tempo (speed) based on sound wave calculation for CD data format quality, and an algorithm formula to synchronize when a cursor on a scroll bar is moved, or paused.

Similar to FIG. 4, FIG. 10 shows an effective synchronization of the audio data (sound wave) and video data (frame). FIG. 10 describes the SyncWave Algorithm (Sound Position=8,192×(Video Position×5.3833)+6) for synchronizing audio and video data when a cursor is moved or playback is stopped or temporarily paused. In one embodiment, a mechanism and a formula is provided to adjust the playback position of audio sound waves to the playback position of video frames in normal tempo (speed) based on sound wave calculation for CD data format quality. An algorithm formula (var pp=(nStream[0].time×53833)+6) for seeking the correct position to match audio and video is also provided to synchronize when a cursor on a scroll bar is moved or video playback is paused.

Figure 11:
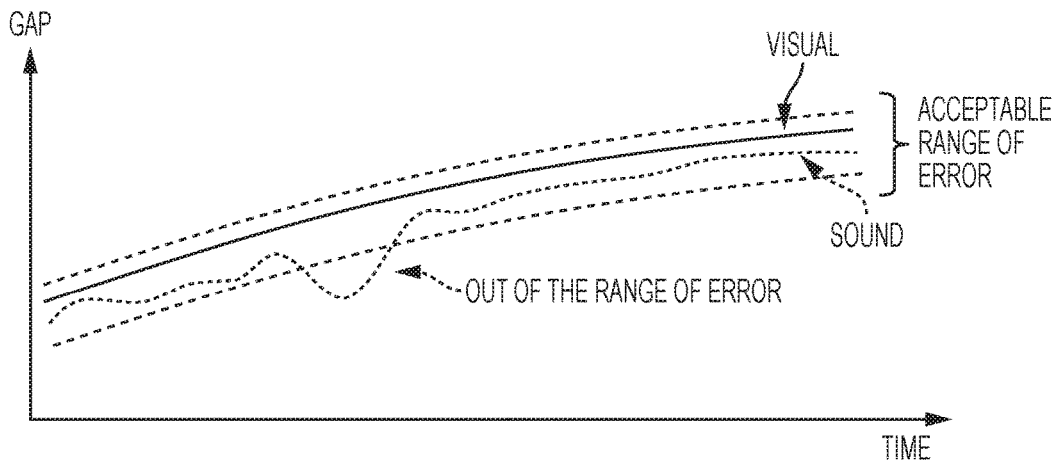
FIG. 11 is a graphic representation and an algorithm formula for synchronizing sound wave position and video frame position when the sound wave position creates a gap outside of the acceptable range of error with respect to the video frame position.

FIG. 11 illustrates an algorithm formula (coded in ActionScript) for synchronize SWP and VFP when the SWP creates a gap outside of the acceptable range of error with respect to the VFP.

Figure 12:
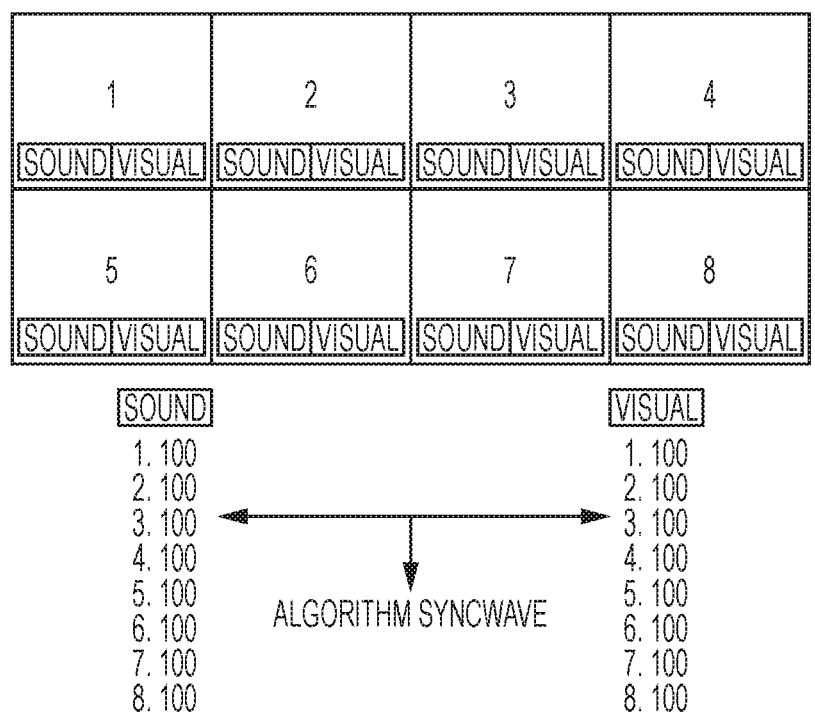
FIG. 12 is a graphic representation of a user interface that includes eight user windows displaying audio and video, including data numbers, from each user in synchronization.

FIG. 12 illustrates a user interface that includes eight user windows displaying both audio and video, including data numbers, from each user in synchronization. For each user, the audio and video synchronization for each user is displayed, 100 indicates perfect synchronization.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes, which come within the meaning and range of equivalency of the claims, are to be embraced within their scope. Skilled artisans may implement the described functionality in varying ways for each particular application, but such implementation decisions should not be interpreted as causing a departure from the scope of the disclosed apparatus and methods. The steps of the method or algorithm may also be performed in an alternate order from those provided in the examples.

The invention claimed is:

1. A method for synchronizing audio and video data from one or more users in an online network environment comprising:
    uploading by a host user a project to an Internet website in the online network environment that permits access to the project by one or more other users, wherein the Internet website in the online network environment comprising an audio and video player/recorder that enables the host user and the one or more other users to upload, download, record, and playback audio and video within the Internet website in the online network environment in real time and simultaneously;
    the audio and video player/recorder is configured to playback audio and video within the Internet website in the online network environment at a normal, increased, or reduced playback speed without audio distortion of pitch or key, shifting, or distortion of video, and preventing loss of synchronization between audio and video;
    the project uploaded to the Internet website comprises a first audio data and a first video data wherein the first audio data comprising a first set of audio playback positions, and the first video data comprising a first set of video playback positions; the first set of audio playback positions temporally correspond to the first set of video playback positions; a temporal discrepancy between the first set of audio playback positions and the first set of video playback positions occurs during playback of the first set of audio playback positions and the first set of video playback positions;
    providing a synchronizing algorithm within the Internet website configured to capture and calculate the temporal discrepancy between the first set of audio playback positions and the first set of video playback positions wherein the synchronizing algorithm eliminates the temporal discrepancy by temporally adjusting the first set of audio playback positions to temporally correspond to the first set of video playback positions so that the first set of audio playback positions and the first set of video playback positions are substantially in synchronization temporally and are maintained in synchronization temporally during playback by the audio and video player/recorder at the normal, increased, or reduced playback speed; the synchronizing algorithm is further configured to compensate loss of synchronization during audio and video playback by automatically capturing, calculating and eliminating any other discrepancy between the first set of audio playback positions and the first set of video playback positions;
    the synchronizing algorithm automatically pauses playback of the first audio data when, during playback, any of the first set of video playback positions temporally falls behind the corresponding audio playback position, and resumes playback of the first audio data when the first set of video playback positions and the first set of audio playback positions become in temporal synchronization; and
    presenting the first video data and first audio data in a first view frame in the online network environment so that the first view frame is viewable online by the host user and the one or more other users in real time and simultaneously.

2. A method for synchronizing audio and video data from one or more users in an online network environment according to claim 1 wherein the synchronizing algorithm is configured to capture and adjust the first set of audio playback positions and the first set of video playback positions in real time.

3. A method for synchronizing audio and video data from one or more users in an online network environment according to claim 1 further comprising:
    uploading by the one or more other users to the project in the online network environment a second audio data and a second video data wherein the second audio data comprising a second set of audio payback positions, and the second video data comprising a second set of video playback positions; the second set of audio playback positions temporally correspond to the second set of video playback positions;
    the synchronizing algorithm captures and adjusts the first set and second set of audio playback positions and the first set and second set of video playback positions wherein the synchronizing algorithm temporally adjusts the first set and second set of audio playback positions and/or the first set and second set of video playback positions so that the first set and second set of audio playback positions and the first set and second set of video playback positions are substantially in synchronization temporally and are maintained in synchronization temporally during playback by the audio and video player/recorder at the normal, increased, or reduced playback speed; and
    presenting the second video data and second audio data in a second view frame in the online network environment so that the second view frame is viewable online by the host user and the one or more other users in real time and simultaneously.

4. A method for synchronizing audio and video data from one or more users in an online network environment according to claim 3 further comprising presenting the first view frame and the second view frame in real time and simultaneously within a third view frame wherein the third view frame is viewable online by the host user and the one or more other users in real time and simultaneously.

5. A system for synchronizing audio and video data from one or more users in real time within an online network environment comprising:
    a user interface in an Internet website configured to allow a host user uploading a project to the Internet website in the online network environment that permits access to the project by one or more users;
    the user interface further comprising an audio and video player/recorder configured to enable the host user and the one or more users to upload, download, record, and playback audio and video within the Internet website in the online network environment in real time and simultaneously, wherein the audio and video player/recorder is configured to playback audio and video within the Internet website in the online network environment at a normal, increased, or reduced playback_speed without audio distortion of pitch or key, shifting, or distortion of video, and preventing loss of synchronization between audio and video;

the project uploaded to the Internet website comprises a first audio data and a first video data wherein the first audio data comprising a first set of audio playback positions and the first video data comprising a first set of video playback positions; the first set of audio playback positions temporally correspond to the first set of video playback positions; a temporal discrepancy between the first set of audio playback positions and the first set of video playback positions occurs during playback of the first set of audio playback positions and the first set of video playback positions;

a synchronizing algorithm within the Internet website configured to capture and calculate the temporal discrepancy between the first set of audio playback positions and the first set of video playback positions wherein the synchronizing algorithm eliminates the temporal discrepancy by temporally adjusting the first set of audio playback positions to temporally correspond to the first set of video playback positions so that the first set of audio playback positions and the first set of video playback positions are substantially in synchronization temporally and are maintained in synchronization temporally during playback by the audio and video player/recorder at the normal, increased, or reduced playback speed; the synchronizing algorithm is further configured to compensate loss of synchronization during audio and video playback by automatically capturing, calculating and eliminating any other discrepancy between the first set of audio playback positions and the first set of video playback positions;

the synchronizing algorithm automatically pauses playback of the first audio data when, during playback, any of the first set of video playback positions temporally falls behind the corresponding audio playback position, and resumes playback of the first audio data when the first set of video playback positions and the first set of audio playback positions become in temporal synchronization; and the user interface is further configured to present the first video data and the first audio data in a first view frame in the online network environment so that the first view frame is viewable online by the host user and the one or more other users in real time and simultaneously.

6. A system for synchronizing audio and video data from one or more users in real time within an online network environment according to claim 5 wherein the synchronizing algorithm is configured to capture and adjust the first set of audio playback positions and the first set of video playback positions in real time.

7. A system for synchronizing audio and video data from one or more users in real time within an online network environment according to claim 5 wherein:

the project further comprises a second audio data and a second video data uploaded by the one or more other users to the online network environment wherein the second audio data comprising a second set of audio payback positions, and the second video data comprising a second set of video playback positions; the second set of audio playback positions temporally correspond to the second set of video playback positions;

the synchronizing algorithm is configured to capture and adjust the first set and second set of audio playback positions and the first set and second set of video playback positions wherein the synchronizing algorithm temporally adjusts the first set and second set of audio playback positions and/or the first set and second set of video playback positions so that the first set and second set of audio playback positions and the first set and second set of video playback positions are substantially in synchronization temporally and are maintained in synchronization temporally during playback by the audio and video player/recorder at the normal, increased, or reduced playback speed; and the user interface presents the second video data and second audio data in a second view frame in the online network environment so that the second view frame is viewable online by the host user and the one or more other users in real time and simultaneously.

8. A system for synchronizing audio and video data from one or more users in real time within an online network environment according to claim 7 wherein the user interface presents the first view frame and the second view frame in real time and simultaneously within a third view frame wherein the third view frame is viewable online by the host user and the one or more other users in real time and simultaneously.

* * * * *